United States Patent
Millet et al.

(10) Patent No.: US 8,826,942 B2
(45) Date of Patent: Sep. 9, 2014

(54) DEVICE FOR CONNECTING AN AIR LEAK DETECTION SYSTEM TO A SLEEVE THAT ENVELOPS A PRESSURIZED AIR HOSE OF AN AIRCRAFT

(75) Inventors: Gérard Millet, Pibrac (FR); Terence J Burt, Solomiac (FR); Xavier Bernard, Bruges (FR)

(73) Assignees: Airbus Operations (SAS), Toulouse (FR); Airbus Operations Ltd., Bristol (GB)

( * ) Notice: Subject to any disclaimer, the term of this patent is extended or adjusted under 35 U.S.C. 154(b) by 211 days.

(21) Appl. No.: 13/437,995

(22) Filed: Apr. 3, 2012

(65) Prior Publication Data

US 2012/0247597 A1    Oct. 4, 2012

(30) Foreign Application Priority Data

Apr. 4, 2011    (FR) ...................... 11 52868

(51) Int. Cl.
| | |
|---|---|
| *F16L 55/00* | (2006.01) |
| *G01M 3/00* | (2006.01) |
| *G01M 3/02* | (2006.01) |
| *G01M 3/28* | (2006.01) |
| *B64D 13/00* | (2006.01) |
| *G01M 3/16* | (2006.01) |

(52) U.S. Cl.
CPC .............. *G01M 3/165* (2013.01); *G01M 3/002* (2013.01); *B64D 13/00* (2013.01)
USPC ....................................... 138/104; 73/40.5 R

(58) Field of Classification Search
CPC ....... F16L 55/00; F16L 2201/30; F16L 11/12; F16L 59/135; F16L 59/14; B64D 13/00; G01M 3/18; G01M 3/28; G01M 3/283; G01M 3/00; G01M 3/165
USPC ........ 138/103, 104, 148; 73/40–49.8; 285/93; 374/4
See application file for complete search history.

(56) References Cited

U.S. PATENT DOCUMENTS

| | | | | |
|---|---|---|---|---|
| 4,402,359 | A * | 9/1983 | Carnavos et al. | 165/70 |
| 4,534,662 | A * | 8/1985 | Barlian | 374/4 |

(Continued)

FOREIGN PATENT DOCUMENTS

| | | |
|---|---|---|
| EP | 0240620 | 10/1987 |
| EP | 1602910 | 12/2005 |
| EP | 2230436 | 9/2010 |

OTHER PUBLICATIONS

French Search Report dated Nov. 4, 2011 in corresponding French Appln. 11 52868.

*Primary Examiner* — Paul R Durand
*Assistant Examiner* — Vishal Pancholi
(74) *Attorney, Agent, or Firm* — Young & Thompson

(57) ABSTRACT

An aircraft includes a hose that makes it possible to channel the pressurized air that is used in a sleeve (52) that delimits an annular chamber with the hose, with the sleeve (52) including at least one opening (54) that is delimited by an edge (58) that makes it possible to link the annular chamber and the outside of the sleeve (52), and a leak detection system that includes at least one loop (A) in the form of a threadlike element (56), characterized in that it includes a connecting device that includes a ring (60) that is connected at at least one connecting point (64) with a loop (A), and a flexible wall that delimits a hose (68) for channeling the air that extends from the edge (58) of the opening (54) up to the ring (60).

12 Claims, 4 Drawing Sheets

(56) References Cited

U.S. PATENT DOCUMENTS

| | | | |
|---|---|---|---|
| 4,602,504 A * | 7/1986 | Barber | 73/49.8 |
| 4,750,189 A * | 6/1988 | Lancaster et al. | 374/4 |
| 5,176,025 A * | 1/1993 | Butts | 73/40.5 R |
| 7,155,961 B2 * | 1/2007 | Fernandes et al. | 73/49.1 |
| 2004/0004487 A1 * | 1/2004 | Vanzuilen et al. | 324/663 |
| 2008/0143540 A1 * | 6/2008 | Savla | 340/605 |
| 2010/0243095 A1 | 9/2010 | Bourlart | |

* cited by examiner

DEVICE FOR CONNECTING AN AIR LEAK DETECTION SYSTEM TO A SLEEVE THAT ENVELOPS A PRESSURIZED AIR HOSE OF AN AIRCRAFT

BACKGROUND OF THE INVENTION

Field of the Invention

This invention relates to a device for connecting an air leak detection system to a sleeve that envelops a pressurized air hose of an aircraft.

At 10, FIG. 1 shows an aircraft that integrates different sources of pressurized air that are connected, by a network 12 of hoses, to systems that have pressurized air requirements.

The engines 14 as well as the auxiliary power group 16 constitute pressurized hot-air sources that are integrated into the aircraft. The latter can also comprise means 18 for connecting an external pressurized air source, with said means 18 being located under the aircraft to supply it with pressurized air when it is on the ground.

As a system that uses pressurized air, the aircraft comprises, i.a., air-conditioning systems 20, systems for defrosting the wings 22, ventilation systems, the engine starting system, and the fuel-tank pressurization system.

FIG. 2 shows a hose 24 that makes it possible to channel the pressurized air from a source 26 to a system 28 that uses it.

This hose 24 comprises a leak detection system that makes it possible to indicate the presence of a pressurized air leak, advantageously its location, so as to warn of the risks of damage to the structure of the aircraft or elements that are present in the environment of this possible leak because of the high temperature of the pressurized air channeled into the hose 24.

BRIEF SUMMARY OF THE INVENTION

This detection system comprises at least one detection loop A that consists of heat-sensitive sensors that are connected in series.

The detection loop A comes in the form of a semi-rigid, threadlike element that can be twisted so as to adapt its shape to the desired detection path.

According to one embodiment, the sensors have a resistance that varies based on the temperature. Thus, it is enough to take measurements on the loop A to determine the presence of a leak, a leak that corresponds to a variation of the resistance of the loop.

Advantageously, the detection system comprises two loops A and B that are arranged in parallel and in a coaxial manner to be able to locate the leak. Certain portions of the hoses 24 can be surrounded by sleeves 30 ensuring thermal insulation. Thus, these sleeves 30 are preferably provided at the connection zones between two portions of hoses.

As illustrated in FIG. 3, a sleeve 30 comes in the form of a tube with a diameter that is larger than the one of the hose 24 in such a way as to delimit an annular chamber 32 with the hose, each end of the sleeve being kept flattened against the hose by a clamp. According to one embodiment, the wall of the sleeve is flexible and comprises an insulating material that is bagged between two films made of plastic material.

Each sleeve 30 comprises at least one opening 34 that makes it possible to link the annular chamber 32 to the outside.

In the event of a leak from the wall of the hose or connecting portion between two hoses inside the annular chamber 32, pressurized hot air escapes from the opening 34.

So that this leak is detected, it is necessary that a portion of the loop or a portion of each loop passes above the opening 34.

According to one embodiment, the loops A and B are made integral with the hoses using braces 36 that comprise a tubular shape into which passes the loop A or B that is extended by a foot that can be flattened and connected to a hose 24. In general, these braces 36 are arranged outside of the zones that are covered by the sleeve 30 so as not to perforate it although they are relatively far away from the opening 34.

The installation of the sleeves 30 and/or the detection system can prove problematic for two reasons.

On the one hand, it is difficult to comply with the alignment between the detection loop A or B and the opening 34. If the loop A or B is not aligned, it is possible to correct this poor alignment by deforming the loop in such a way that a portion is arranged facing the opening 34. However, taking into account how far away the braces 36 are, the path taken by the loop may be accidentally modified and may no longer pass facing the opening 34.

On the other hand, to ensure an optimal operation of the leak detection system, it is necessary that the loops be arranged at an optimal distance from the opening 34. To correct this spacing, it is possible to deform the loop A or B in such a way that the distance separating it from the opening is optimal. However, as above, taking into account how far away the braces 36 are, the path taken by the loop may be accidentally modified and the spacing between the loop and the opening 34 may no longer be optimal.

Also, the purpose of this invention is to eliminate the drawbacks of the prior art by proposing a device for connecting a detection system to a sleeve that envelops a pressurized air hose, making it possible to position said detection system relative to an opening that is made in said sleeve.

For this purpose, the invention has as its object an aircraft that comprises, on the one hand, a hose that makes it possible to channel the pressurized air that is used in a sleeve that delimits an annular chamber with said hose, with said sleeve comprising at least one opening that is delimited by an edge that makes it possible to link said annular chamber and the outside of the sleeve, and, on the other hand, a leak detection system that comprises at least one loop in the form of a threadlike element, characterized in that it comprises a connecting device that comprises, on the one hand, a ring that is connected at at least one connecting point with a loop, and, on the other hand, a flexible wall that delimits a hose for channeling the air that extends from the edge of the opening up to the ring.

Contrary to the prior art, the loop is not held by a brace that is distant from the opening but by a connecting device that is arranged at the opening that ensures the connection between said opening and the loop and that makes it possible to ensure that this position will be preserved and will not be accidentally modified. In addition, the flexible wall makes it possible to channel the air in the direction of the loop.

BRIEF DESCRIPTION OF THE DRAWINGS

Other characteristics and advantages will emerge from the following description of the invention, a description that is provided only by way of example, relative to the accompanying drawings in which.

DETAILED DESCRIPTION OF THE PREFERRED EMBODIMENTS

Figure 1:
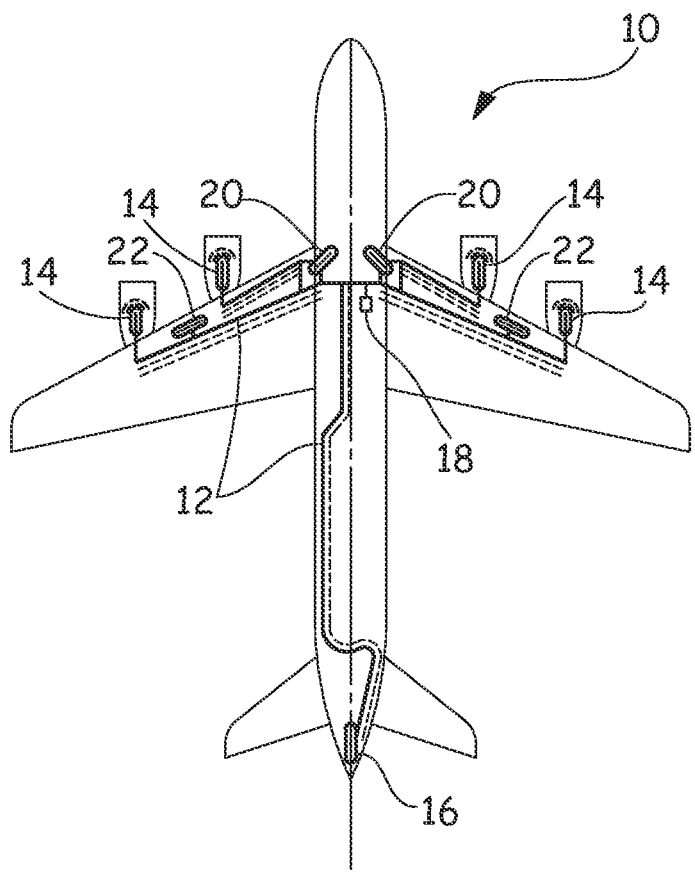
FIG. 1 is a diagrammatic view of an aircraft that illustrates pressurized air sources connected via a network of hoses to systems that use the pressurized air.
Figure 2:
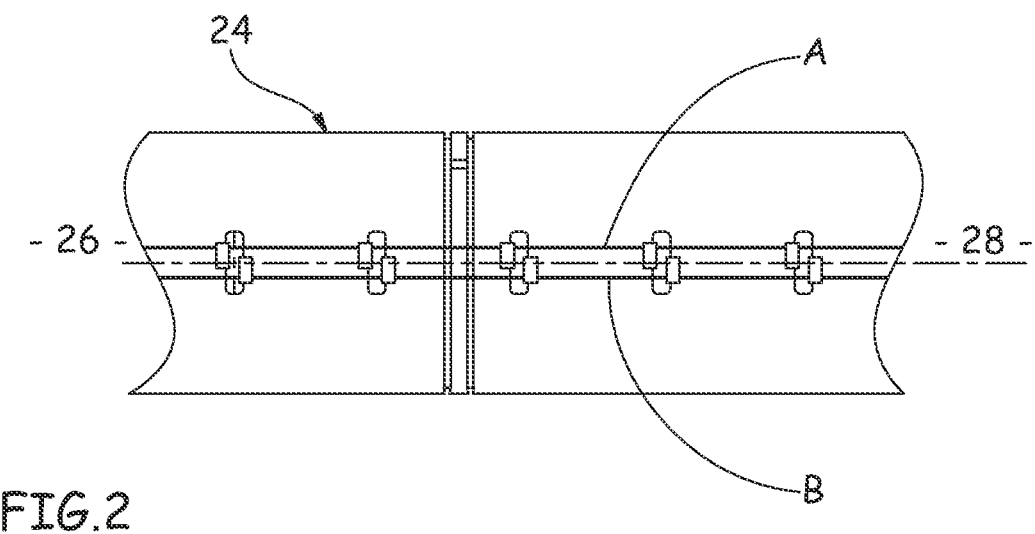
FIG. 2 is a side view that illustrates a leak detection system connected to a hose.
Figure 3:
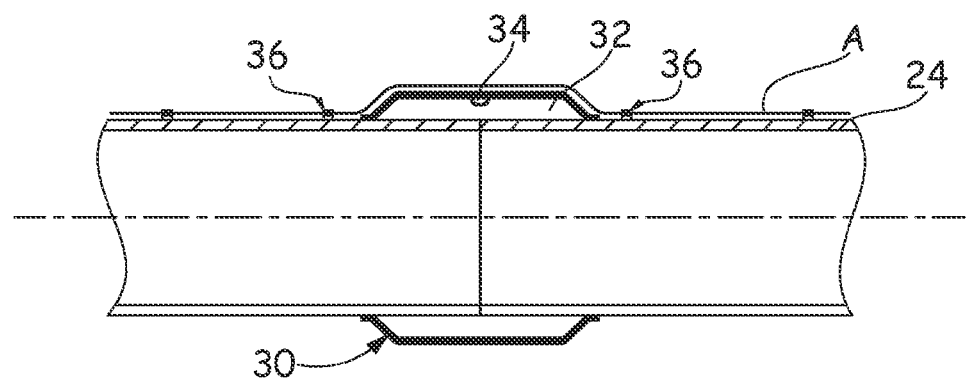
FIG. 3 is a cutaway that illustrates a leak detection system that is positioned relative to an opening that is made in a sleeve that envelops one or more hoses according to a first arrangement of the prior art.
Figure 4:
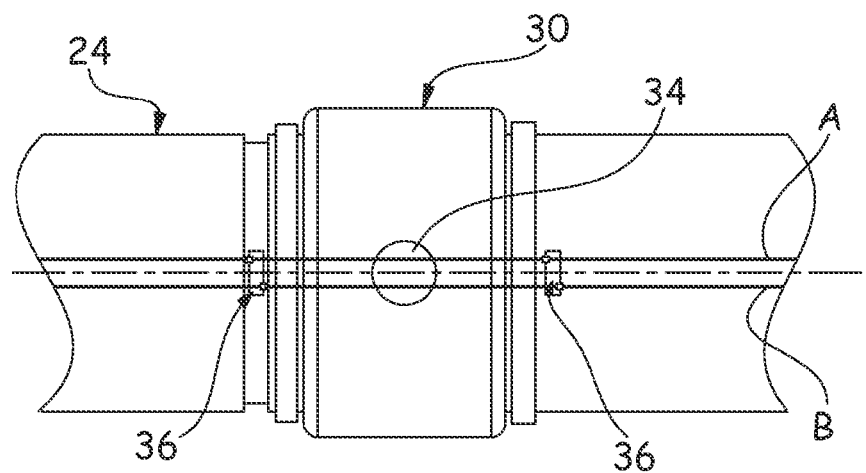
FIG. 4 is a top view that illustrates a leak detection system that is positioned relative to an opening that is made in a sleeve that envelops one or more hoses according to a first arrangement of the prior art.
Figure 5:
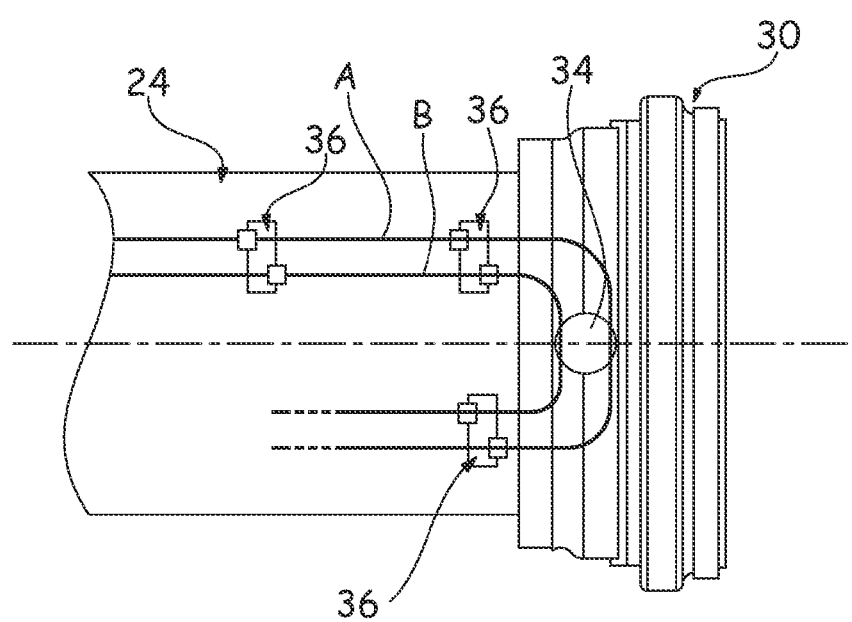
FIG. 5 is a top view that illustrates a leak detection system that is positioned relative to an opening that is made in a sleeve that envelops one or more hoses according to a second arrangement of the prior art.
Figure 6:
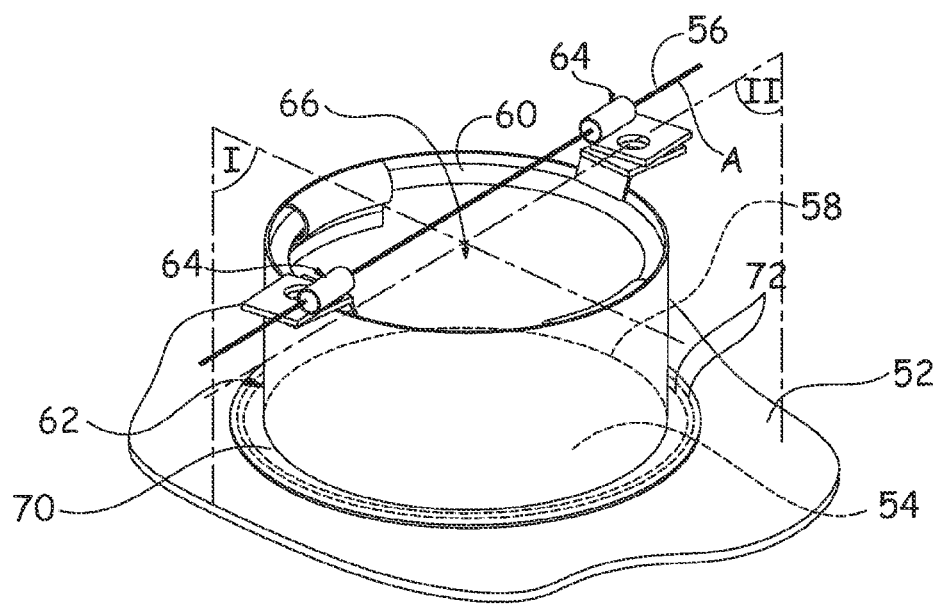
FIG. 6 is a perspective view of a device for connecting a detection system to a sleeve that envelops a hose according to a first variant of the invention.
Figure 7:
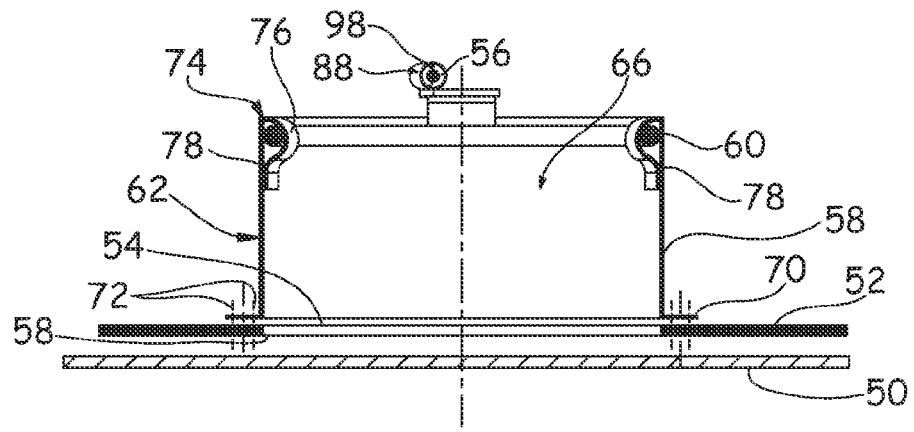
FIG. 7 is a cutaway of the connecting device of FIG. 6 along a plane that is denoted I.
Figure 8:
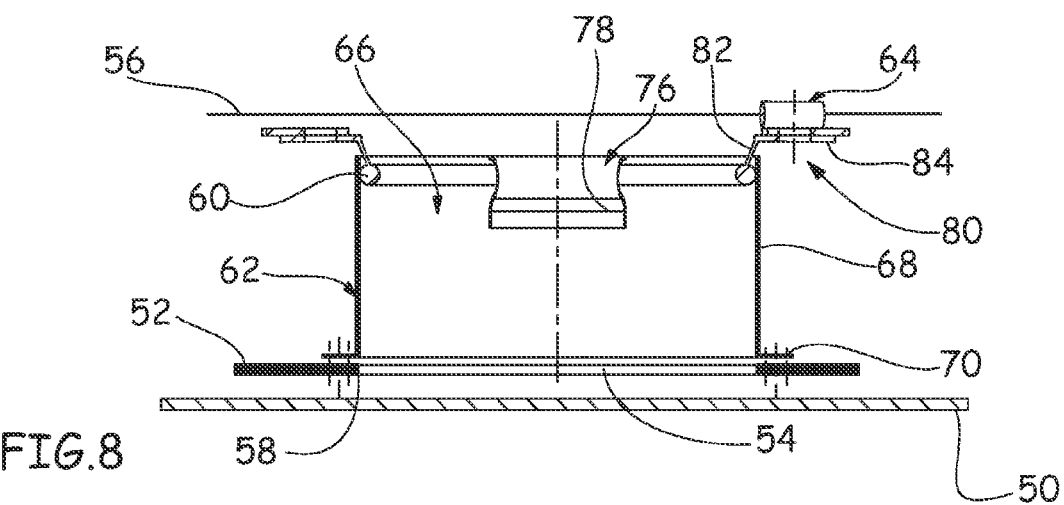
FIG. 8 is a cutaway of the connecting device of FIG. 6 along a dashed line denoted II.

FIGS. 6, 7 and 8 diagrammatically show a portion of a hose 50 that makes it possible to channel the generally hot pressurized air, with a portion of a sleeve 52 enveloping said hose 50 and comprising at least one opening 54.

The hose 50, the nature and the shapes of the sleeve 52 as well as the connecting means between said sleeve 52 and the hose 50 are not described in more detail because these elements may be identical to those of the prior art.

Figure 11:
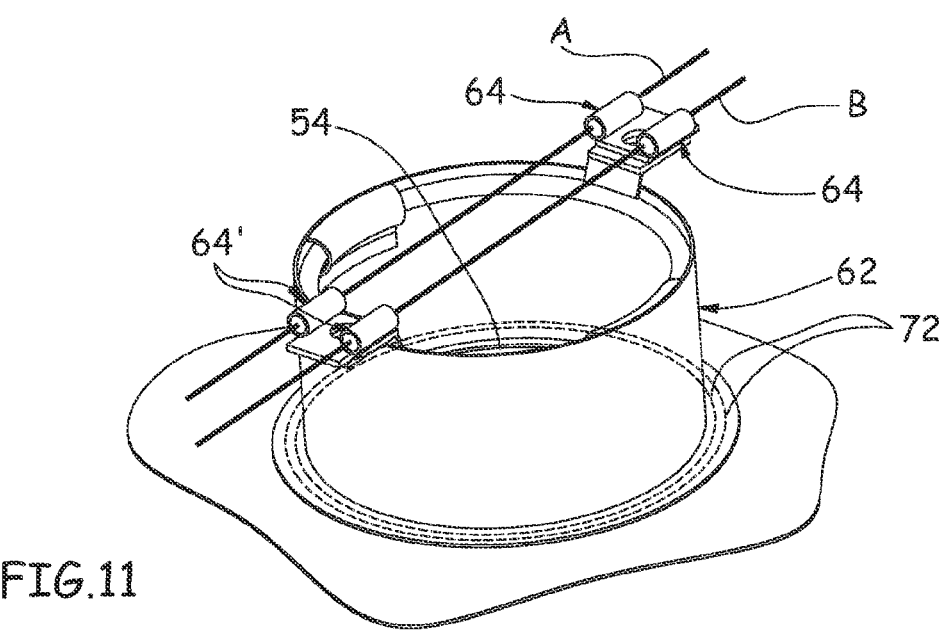
FIG. 11 is a perspective view of a connecting device according to another variant of the invention.

As for the prior art, the detection system comprises at least one loop A, as illustrated in FIG. 6, and preferably two loops A and B, as illustrated in FIG. 11.

Each loop A or B comprises at least one sensor in the form of a threadlike element 56 of which only a portion is illustrated in FIGS. 6 and 11.

This sensor is heat-sensitive. With the pressurized air having a temperature that is higher than the temperature of the environment outside of the sleeve, a leak corresponds to a temperature variation detected by the sensor.

According to one embodiment, the resistance of the sensor varies based on the temperature, and the detection system comprises means for measuring the resistance of the loops A and/or B and for detecting a variation of said resistance. In this embodiment, the threadlike element 56 is used to convey an electric characteristic between a leak point and a measuring device that is offset relative to the leak point. As a variant, the threadlike element 56 could be used to convey heat between a leak point and a device for measuring temperature. Consequently, the invention is not limited to this type of sensor whose resistance varies based on the temperature.

The opening 54 is delimited by an edge 58 that is defined by a closed curve that can be circular, have an oblong shape, or any other shape. The edge 58 makes it possible to define a passage section.

According to the invention, a connecting device is provided between the edge 58 of the opening 54 and each loop A, B.

This connecting device comprises at least one link between the edge 58 of the opening 54 and each loop A and B.

According to one embodiment, the connecting device comprises a ring 60 that is connected to the edge 58 of the opening by connecting means 62 and at least one connecting point 64 between a loop A or B and said ring 60.

Ring is defined as a threadlike element that follows a closed curve. It can be circular, oblong, etc. As appropriate, the ring 60 can have a shape that may or may not be identical to the edge 58.

According to one embodiment, the ring can be metal or made of another material. It can have a circular section on the order of several millimeters. The connecting means 62 make it possible to keep the ring 60 in a plane that is parallel to the one that contains the opening 54 or to the mid-plane of the opening 54 and at a certain distance from said opening 54.

Advantageously, the connecting device comprises a means 66 for channeling the air flow that exits from the opening 54 up to the ring 60.

According to one embodiment, the means 66 for channeling the air comprises a flexible wall that delimits a hose 68 that extends from the edge 54 up to the ring 60. Preferably, this flexible wall is made of the same material as the one that is used for producing the outside film of the sleeve 52.

At its end in contact with the sleeve 52, the hose 68 comprises a collar 70 that is flattened against the outside surface of the sleeve 52 and is connected in an essentially airtight manner to the latter. According to one embodiment, the collar 70 is connected to the sleeve by at least one peripheral tap line 72. In FIG. 6, the collar 70 is connected to the sleeve by two tap lines 72 or by any other suitable means, such as, for example, by gluing.

Advantageously, the hose 68 also performs the function of connecting means 62.

For this purpose, the second end 74 of the hose 68 comprises at least one lap joint 76 into which the ring 60 is inserted. The second end 74 is folded toward the inside or toward the outside of the hose, as illustrated in FIG. 7, with the ring 60 being arranged between the folded edge and the hose, and then sewn along at least one tap line 78 over at least a portion of the periphery of the hose 68 in such a way as to form at least one lap joint 76 into which the ring 60 is inserted.

Advantageously, the tap line 78 does not extend over the entire periphery of the hose 68 in such a way as to make possible a rotational movement with the ring 60. Thus, the second end 74 comprises two diametrically opposite lap joints 76 that each extend over an angular sector that varies from 30 to 130°, for example.

According to another characteristic of the invention, the connecting device comprises—for each loop A or B—two connecting points 64, 64' between said loop and the ring 60 in such a way that the loop is secant to the ring 60 and not tangent. This arrangement makes it possible to ensure that the loop is arranged in the air stream exiting from the opening 54.

To ensure the connection between the ring 60 and the loop A or B, the ring 60 comprises at least one foot 80 that extends in a radial direction toward the outside of the ring. Advantageously, the ring 60 comprises two feet 80, 80' that are diametrically opposite in such a way as to obtain two connecting points 64, 64' for each loop A or B.

Figure 9:
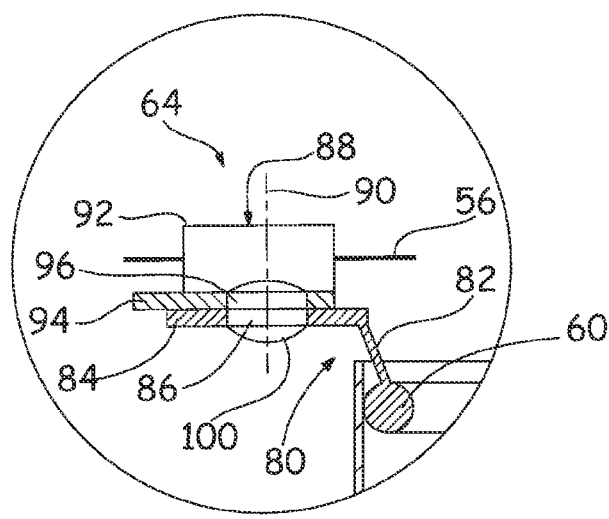
FIG. 9 is a cutaway along a first cutting plane of a connecting point.
Figure 10:
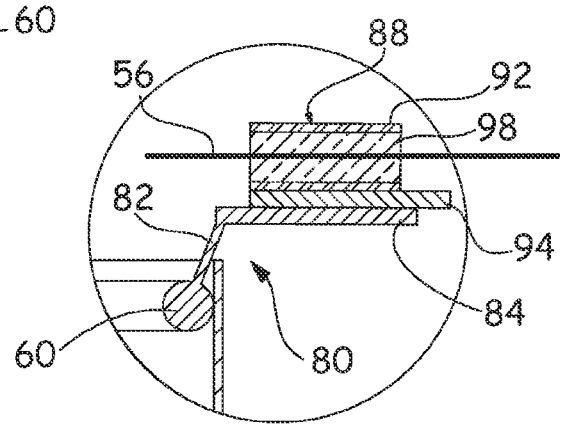
FIG. 10 is a cutaway along another cutting plane of a connecting point.

As illustrated in FIGS. 9 and 10, each foot 80 comprises two sections, a first inclined section 82 connected to the ring 60 and extended by a second section 84 that is arranged in a plane that is essentially parallel to the one that contains the ring 60. The length and/or the tilt of the first section 82 make it possible to adjust the distance that separates the loop A or B from the ring 60.

Each second section 84 comprises a hole 86 that makes it possible to make the loop integral with said foot 80 in such a way as to constitute a connecting point 64, 64'.

To ensure the connection between a loop A or B and the second section 84, it is possible to use a cable brace 88.

Advantageously, the brace-cable 88 can pivot relative to the foot 80 around an axis 90 that is perpendicular to the second section 84 and therefore to the plane of the ring 60.

According to one embodiment, the cable brace 88 comprises a tube 92 that is extended by a foot 94 with a hole 96.

In addition, a sleeve 98 that performs the function of a thermal and electrical insulator is inserted between the loop A or B and the tube 92 of the brace-cable 88. The foot 94 of the cable brace 88 is flattened against the second section 84 of the foot 80 of the ring 60 and held using an attachment 100 that passes through the holes 86 and 96, for example. This arrangement makes it possible to be able to pivot the brace-cable 88 relative to the ring 60.

This degree of freedom that is completed by the rotational movement of the ring 60 relative to the hose 68 makes it possible to improve the adaptability of the connecting device that can be adapted to the different paths taken by the loops.

As illustrated in FIG. 6, a loop A comprises two sleeves 98 that are each arranged in a tube 92 of a cable brace 88, with the loop A being connected to the ring 60 by two brace-cables 88, each connected to a foot 80 of the ring 60.

According to another variant that is illustrated in FIG. 11, the ring 60 can be connected to two loops A and B. In this case, each foot 80 of the ring supports two cable braces 88, one for each loop.

The invention claimed is:

1. A sleeve and leak detection assembly for an aircraft, comprising:
    a hose (50) that connects and channels pressurized air from a pressurized air source to a system with pressurized air requirements;
    a sleeve (52) that delimits an annular chamber around said hose (50),
    said sleeve (52) comprising at least one opening (54) delimited by an edge (58), said at least one opening (54) providing a link between said annular chamber and an outside of the sleeve (52); and
    a leak detection system that comprises
    i) at least one loop (A, B) in the form of a threadlike element (56), and
    ii) a connecting device that comprises a ring (60) connected at at least one connecting point (64) with the loop (A, B), and a flexible wall that delimits a channel hose (68) forming a pressurized air channel that extends from the edge (58) of the opening (54) up to the ring (60).

2. The sleeve and leak detection assembly according to claim 1, wherein the channel hose (68), at a first end that is in contact with the sleeve (52), comprises a collar (70) flattened against an outside surface of the sleeve (52) and connected in an essentially airtight manner to the outside surface of the sleeve (52).

3. The sleeve and leak detection assembly according to claim 1, wherein the channel hose (68) includes a first end in contact with the sleeve (52) and, at an opposite second end (74), comprises at least one lap joint (76), the ring (60) being inserted into the at least one lap joint (76).

4. The sleeve and leak detection assembly according to claim 3, wherein the second end (74) of the channel hose (68) comprises two diametrically opposite lap joints (76) that each extend over an angular sector in such a way to allow a rotational movement of the ring (60) relative to the channel hose (68).

5. The sleeve and leak detection assembly according to claim 1, wherein for each of said at least one loop (A, B), the connecting device comprises two connecting points (64, 64') between each said loop and the ring (60) in such a way that each said loop is secant to the ring (60).

6. The sleeve and leak detection assembly according to claim 5, wherein,
    the ring (60) comprises at least one foot (80) that extends in a radial direction toward an outside of the ring, and
    each said loop (A, B) is inserted into a cable brace (88), the cable brace (88) being connected to the foot (80) of the ring (60) and pivotable relative to said foot (80) along an axis (90) perpendicular to a first plane that contains the ring (60).

7. The sleeve and leak detection assembly according to claim 6, wherein,
    each said at least one foot (80) comprises a first inclined section (82) connected to the ring (60), the first inclined section (82) being extended by a second section (84) arranged in a plane that is essentially parallel to the first plane that contains the ring (60), and
    a length of the first section (82) allows adjustment of a distance that separates each said loop (A, B) from the ring (60).

8. The sleeve and leak detection assembly according to claim 2, wherein the channel hose (68), at a second end (74), comprises at least one lap joint (76), the ring (60) being inserted into the at least one lap joint (76).

9. The sleeve and leak detection assembly according to claim 8, wherein the second end (74) of the channel hose (68) comprises two diametrically opposite lap joints (76) that each extend over an angular sector in such a way to allow a rotational movement of the ring (60) relative to the channel hose (68).

10. The sleeve and leak detection assembly according to claim 2, wherein for each of said at least one loop (A, B), the connecting device comprises two connecting points (64, 64') between each said loop and the ring (60) in such a way that each said loop is secant to the ring (60).

11. The sleeve and leak detection assembly according to claim 6, wherein,
    each said at least one foot (80) comprises a first inclined section (82) connected to the ring (60), the first inclined section (82) being extended by a second section (84) arranged in a plane that is essentially parallel to the first plane that contains the ring (60),
    a tilt of the first section (82) allowing adjustment of a distance that separates each said loop (A, B) from the ring (60).

12. The sleeve and leak detection assembly according to claim 6, wherein,
    each said at least one foot (80) comprises a first inclined section (82) connected to the ring (60), the first inclined section (82) being extended by a second section (84) arranged in a plane that is essentially parallel to the first plane that contains the ring (60), and
    a length and a tilt of the first section (82) allowing adjustment of a distance that separates the each said loop (A, B) from the ring (60).

* * * * *